Oct. 4, 1960   J. D. W. BRYANT ET AL   2,955,253
FLAW DETECTION

Filed Nov. 14, 1956

INVENTORS
John Dudley William Bryant
Leonard Thomas Perriam

BY Cushman, Darby + Cushman
ATTORNEYS

United States Patent Office 2,955,253
Patented Oct. 4, 1960

2,955,253

FLAW DETECTION

John Dudley William Bryant, Aston, Birmingham, and Leonard Thomas Perriam, Erdington, Birmingham, England, assignors to Imperial Chemical Industries Limited, London, England, a corporation of Great Britain Filed Nov. 14, 1956, Ser. No. 622,214

Claims priority, application Great Britain Mar. 7, 1956

24 Claims. (Cl. 324—37)

This invention is concerned with the non-destructive detection of flaws in metals and is particularly concerned with a probe device for detecting flaws in and testing generally, tubular metal elements such as boiler or condenser tubes, without damaging the tubes.

It is desirable periodically to test, in a non-destructive manner, boiler or condenser tubes, in order to determine whether flaws, such as those caused by internal corrosion, have developed during the use of the tubes, since these flaws weaken the tubes. The tubes usually are stacked together in bundles and their inspection is not, therefore, easily accomplished.

Magnetic and electrical methods have been employed for the purpose of non-destructively testing condenser tubes. In such methods it has been customary to employ a flaw-detecting probe device which is designed so that it can be drawn through a condenser tube and which comprises a core of magnetic material provided with three axially-spaced radially-extending flanges of magnetic material. Two insulated coil elements are coaxially wound around the core, so that each coil is disposed between a pair of flanges. The coils are serially connected and are adapted for connection in two of the arms of an electrical measuring-bridge circuit.

When the coils of such a flaw-detecting probe device are connected to a source of alternating current, the flanges act as pole-pieces and a magnetic field is set up by each coil, such field extending externally of a coil between the pole pieces. It will be appreciated that the intermediate flange acts not only as a pole piece for one of the coils but also as a pole piece for the other of the coils.

When the flaw-detecting probe device is placed within a tube, each field will generate eddy currents in the tube and these eddy currents will react on the coil producing the field so as to modify its resistive and inductive components.

The eddy currents generated in a tube are determined by the conductance of the material, the volume of the material of the tube which is scanned by a coil at any position of the coil, and by the air gap between the pole pieces and the internal wall of the tube, which has a loading effect on the coil.

If the coils form part of a bridge circuit which is balanced when the flaw-detecting probe device is within a part of a tube without any flaws, and the probe device is moved along the tube, the bridge will become unbalanced when a coil passes a flaw in the tube since the eddy currents produced by that coil will be changed by the flaw.

An indication of the existence of such a flaw can be given by a pen recording device suitably connected to the bridge circuit, any flaw in the tube resulting in a kick to one side or other of the normal trace of the pen.

It has been found in practice that such a flaw-detecting probe device can give efficient results when moved along a tube at a relatively low speed, e.g. about 20 feet per minute, but when drawn through at a high speed, e.g. above 100 feet per minute, the eddy currents produced in a given part of the tube by the leading coil have not completely decayed when eddy currents are produced in the same part of the tube by the second coil. This produces spurious results, and can be regarded as a "speed effect," since the bridge becomes unbalanced, although there is no flaw in the tube.

Under some conditions it is essential to inspect condenser tubes at a relatively high speed, for example in the case of a power station where the plant must be idle for as short a time as possible, and it is an object of this invention to provide a flaw-detecting probe device which can readily be adapted to operate at a relatively high speed.

According to this invention, a flaw-detecting probe device comprises a core of magnetic material, a flange of magnetic material at each end of said core and extending radially of the said core, an insulated coil element wound around said core between said flanges, said coil being adapted to form one arm of a measuring bridge circuit, and pole pieces of magnetic material secured to said flanges, the pole pieces being substantially parallel to the axis of the core and the distance between the two pole faces of the pole pieces being less than the distance between the flanges.

According to a feature of the invention, two identical coils are employed and the gap between the pole pieces of one coil is greater than the gap between the pole pieces of the other coil, for a purpose which will be described hereinafter.

Figure 1:
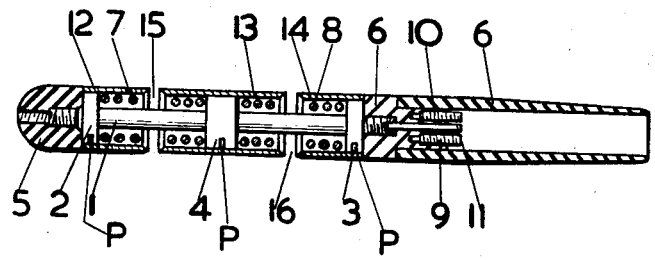
Figure 1 is an elevational view, partly in section, of a flaw-detecting probe device in accordance with one embodiment of the invention.
Figure 2:
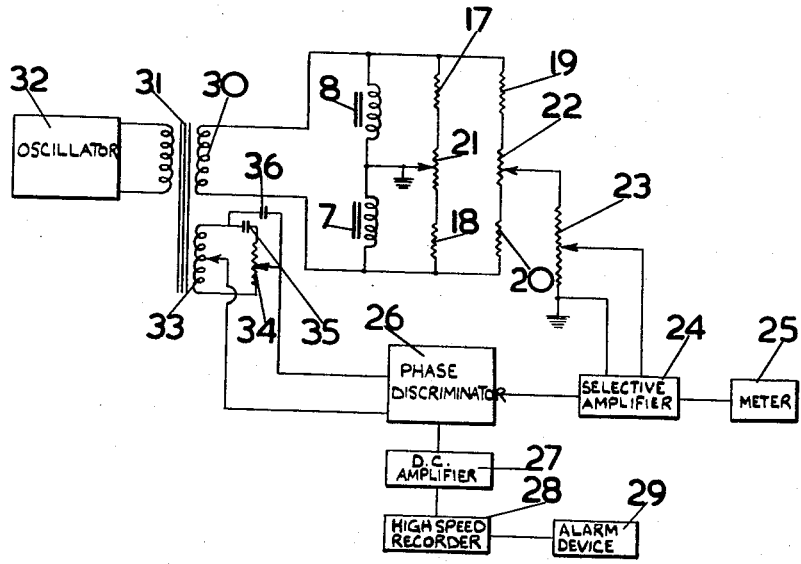
Figure 2 is a schematic arrangement of a suitable circuit for use with the probe device.

Referring to Figure 1 of the drawings, the probe device comprises a central core 1 of magnetic material having end flanges 2, 3 and a central flange 4, also of magnetic material. The leading end of the device is provided with a dome-shaped nose-cap 5, which allows the device easily to be inserted in and moved along a condenser tube or other tubular member.

The other end of the device has an insulated handle or tail piece 6 by which the probe device can be held and through which electrical lead wires to an external electrical circuit may be passed.

A coil 7 is wound between the flanges 2 and 4 and an identical coil 8, that is to say one having the same electrical and magnetic properties as the coil 7, is wound between the flanges 4 and 3. One end of coil 7 is connected to an electrical connection 9, the corresponding end of coil 8 is connected to an electrical connection 10, and the other ends of the two coils are connected to the core 1. The core in its turn is joined to an electrical connection 11. The electrical connections 9, 10 and 11 are carried by the handle 6.

The probe device is provided with three pole pieces 12, 13 and 14. The pole pieces are cylindrical, pole piece 12 surrounding the leading-end portion of coil 7, pole piece 13 surrounding the tail-end portion of coil 7, the flange 4 and the leading end-portion of coil 8, and pole piece 14 surrounding the tail-end portion of coil 8. Each pole piece is secured by pegs P to its associated flange to ensure magnetic stability, and the air gaps 15 and 16 between the pole faces are arranged to be equal in length and at similar distances from the central flange 4. The gap between adjacent pole faces of a pair of pole pieces is thus shorter than the axial length of a coil.

If desired, the air gaps may be filled with a suitable synthetic resinous material (not shown) and the device enclosed within a sheath of high-resistivity material (not shown), such as stainless steel, which has little or no effect on eddy-current losses and which can act to guide the device along a tube. Furthermore, when the stainless steel sheath is longer than the probe device, the angle through which the probe device might tilt during use is considerably reduced.

The two coils form two arms of a modified Faraday or inductance bridge circuit, the other parts of the bridge being formed by resistances 17, 18, 19 and 20 and variable resistances 21 and 22. Variable resistance 21 is connected to the connector 11 and hence to the coils 7 and 8 and is also earthed. Variable resistance 22 is also connected to one end of a resistance 23 which forms part of the input circuit of a selective amplifier 24. The output circuit from the amplifier can be switched to a measuring device 25 which is used for bridge-balancing purposes.

The amplifier 24 may also be switched to a phase discriminator apparatus 26 which in turn is connected to a direct current amplifier 27. The amplifier is connected to a high speed recorder 28 of the pen type, and an alarm device 29.

The modified Faraday bridge circuit is connected to secondary winding 30 of a transformer 31 forming part of an oscillator 32, and the discriminator 26 is connected to secondary winding 33 of the transformer 31 by way of a circuit including a variable resistance 34 and condensers 35 and 36. The frequency of the oscillator will determine the depth of penetration of the eddy currents in an article under examination, the higher the frequency the lower the depth of penetration.

In use, the probe device is placed within a length of standard tube which is known to have no flaws but which otherwise is similar to tubes to be examined, the oscillator circuit is energised and the bridge is balanced by adjustment of variable resistance 21 and/or variable resistance 22, the amplifier being switched at this time to the meter 25.

The probe device is then placed in a tube to be tested, the amplifier 24 is switched to the phase discriminator 26 which is arranged to be in a balanced condition, and the device is then passed along the tube.

So long as there are no flaws in the tube, the bridge remains balanced and there is no output from the phase discriminator 26. The pen of the recorder 28 thus traces out a straight line. When a flaw is scanned by the magnetic field of the leading coil 7, which field, by reason of the small gap between the pole pieces, is a concentrated one, the eddy currents generated in the tube are changed, the electrical properties of the coil 7 are changed and the bridge becomes unbalanced. This results in an output signal from the phase discriminator and the pen of the recorder 28 moves either to the left or to the right of its former direction of movement. When the second coil 8 passes the flaw, the bridge is again unbalanced by an equal but opposite amount, since the coils and their external magnetic fields are identical, and thus the pen moves in the opposite direction. When the second coil has passed the flaw, the bridge reverts to its previous balanced condition until another flaw is reached, and the pen continues to trace out a straight line.

In this way, an indication of the nature of the material may be obtained. Furthermore, this may be obtained at a relatively high speed, e.g. 200 feet per minute, since the gaps between the two sets of pole faces are spaced apart from each other and the eddy currents produced at a given part of a tube will have decayed to zero before eddy currents are generated in that part of the tube by the second coil.

As stated above, the eddy currents generated in the material of a tube are, interalia, determined by the air gap between the pole pieces and the internal wall of the tube. A probe device of the type just described thus gives an indication of any thinning or thickening of the tube provided, of course, that any thickening is not sufficient to prevent the probe device passing along the tube.

When the first coil reaches a thinner portion of the tube, the bridge is unbalanced in one direction and, when the second coil reaches the thinner portion the bridge is unbalanced in the other direction by an equal amount since the coils are identical. The bridge circuit returns to its original condition and the record made by the pen is exactly the same as the record which is made when the probe device passes a flaw. It is not, therefore, possible to discriminate between localised flaws on the one hand and thinning or thickening on the other hand.

Figure 3:
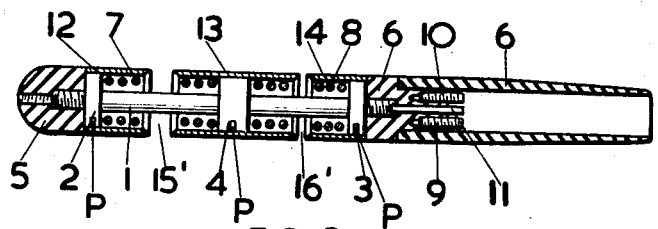
Figure 3 is a view similar to Figure 1, of a modification of the flaw-detecting probe device.

In order to discriminate between the two, the probe device is unbalanced magnetically by moving the pole piece 13 either to the right or to the left of its position shown in Figure 1, and then fixing it in its new position so that the gap between the pole pieces of one coil is greater or smaller than that between the pole pieces of the other coil. Such a modified probe device is shown in Figure 3, where the pole piece 13 has been moved to the right and the gap 15' between adjacent pole faces of one pair of pole pieces 12, 13 is larger than the gap 16' between adjacent pole faces of the other pair of pole pieces 13, 14.

When a probe device which is unbalanced magnetically is employed, the bridge circuit is balanced as described above, by varying the resistances in the circuit, and the device is then passed along a tube. When a localised flaw is reached, the bridge becomes unbalanced by the first coil, is then unbalanced in the opposite sense by the second coil, and when the two coils have passed the flaw, the bridge reverts to its former state.

The pen of the recorder thus moves to one side of its normal direction of movement, then moves to the other side, and then returns to its former position.

If, however, the probe enters a part of the tube which is of increased internal diameter, the two coils are unbalanced by different amounts, since the reaction of the eddy currents on one coil is different from the reaction of the eddy currents on the other coil. This unbalance persists throughout the whole length of the thinned portion of the tube and the effect is to move the pen to one side or other of its former position, during the whole of that period, so that the line traced by the pen is offset with respect to the line previously traced. It is thus possible to discriminate between flaws and thinning or thickening. Of course, any flaws in the thinned portion or thickened portion will be indicated by movements of the pen to one side and then the other of its new position.

Figure 4:
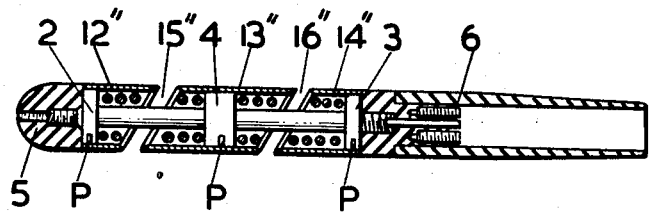
Figure 4 is a view similar to Figure 1 of another modification of the flaw-detecting probe device.

In the probe devices shown in Figures 1 and 3, the pole faces of the pole pieces are parallel to the flanges 2, 3 and 4. In order to increase the sensitivity of the device, the configuration of the pole faces may be changed. For instance, as shown in Figure 4 the gaps 15" and 16" may be of constant width with the pole faces of the pole pieces 12", 13" and 14" inclined at an angle to the axis of the core 1 instead of being perpendicular to it.

Figure 5:
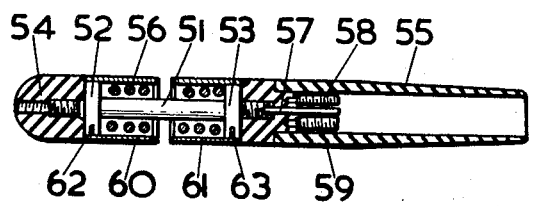
Figure 5 is an elevational view, partly in section, of a flaw-detecting probe device in accordance with a second embodiment of the invention.

In another embodiment of the invention, see Figure 5, the probe device comprises a central core 51 of magnetic material having end flanges 52 and 53, also of magnetic material. The leading end of the device is provided with a dome-shaped nose-cap 54 which allows the device easily to be inserted in and moved along a condenser tube or other tubular member. The other end of the device has an insulated handle or tail piece 55 by which the probe device can be held and through which electrical lead wires to an external electrical circuit may be passed.

A coil 56 is wound between the flanges 52 and 53, being insulated from the core 51, one end of the coil being connected to the core 51, which in turn is electrically connected to an electrical connection 57 and the other end of the coil being connected to one or other of the electrical connections 58 or 59.

The probe device has two pole pieces 60, 61, one being secured by a peg 62 to flange 52 and the other being secured by a peg 63 to flange 53. The two pole pieces are cylindrical and the gap between the pole faces of the pole pieces is shorter than the axial length of the coil.

In use, this probe device is passed along a tubular article to be examined, the coil forming one arm of an inductance bridge circuit. The corresponding arm of the bridge is a coil wound on a similar probe device to that shown in and described with reference to Figure 5. This similar probe device, however, remains stationary within a standard tube (this is to say a tube similar to that under examination without any flaws) during the examination of the other tubular article.

In the embodiments described above, which utilize two coils on the same core or a coil on each of two separate cores, the coils are substantially identical in all respects, and in order to introduce some degree of asymmetry for the purpose of detecting thinner portions of an article under examination the gap between one pair of pole pieces is made different from the gap between the other pair of pole pieces. In other modifications of the invention, this degree of asymmetry may be obtained by having the pole gaps equal and the two coils dissimilar from each other. In such cases, for example, the coils may be wound from the same wire with the number of turns on one coil different from the number of turns of the other coil; the number of turns may be the same but the wire of one coil may have a different resistivity from that of the other coil; or the number of turns and the wire of one coil may be different from the number of turns and the wire of the other coil.

The probe devices described with reference to the drawings are adapted for use inside tubes of circular cross-section. They can, obviously, with suitable modification be utilised for examining tube of a cross-section which is other than circular. Furthermore, probe devices in accordance with the invention can be designed for passing over the outer surface of an elongate article of any cross-section and in this case the pole pieces will lie inside the coils instead of outside the coils.

Figure 6:
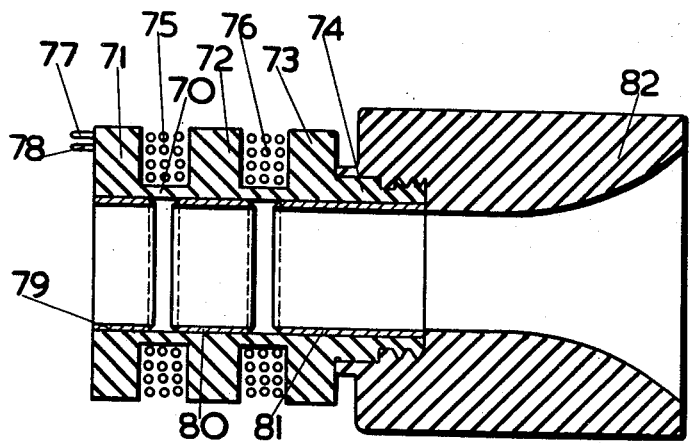
Figure 6 is an elevational view, partly in section, of a flaw-detecting probe device in accordance with a third embodiment of the invention.

A suitable probe device which is designed for passing over the outer surface of an elongate article of circular cross-section is shown in Figure 6.

Referring to Figure 6, the probe device comprises a hollow core 70 of non-magnetic material such as Tufnol, having three flanges 71, 72 and 73 extending radially outwardly thereof, and a nose-piece 74. Two substantially identical coils, 75 and 76, are wound respectively between the pairs of flanges 71, 72 and 72, 73. The coils are suitably connected as in the above embodiments to electrical connections 77 and 78. Three pole pieces 79, 80 and 81 of magnetic material are secured to the internal surface of the hollow core so that each coil is provided with a pair of pole pieces. The gap between each pair of pole pieces is the same but is less than the axial length of a coil. A bell-mouthed member 82 is screwed on to the nose-portion 74 of the core to enable the probe device easily to be led over the end of a metallic article which is to be examined.

The external probe device may be modified in the same manner as the internal probe device described with reference to Figures 1 to 5.

We claim:

1. In apparatus for magnetically testing metallic articles for flaws, a probe device which may be moved relative to an article under test at speeds exceeding 100 feet per minute and still effect accurate flaw detection comprising a core, three flanges on said core, two insulated coil elements wound around said core, one between one pair of flanges, and the other between the other pair of flanges, and pole pieces of magnetic material associated with the coils and extending inwardly from each of said flanges to form two sets of pole faces respectively between adjacent flanges, the distance between adjacent pole faces of adjacent pole pieces being less than the axial length of the associated coil with each such two distances respectively forming magnetic field concentration gaps, said gaps being separated from each other a distance several times the width of either of the gaps to allow all eddy currents produced, in any given part of an article under test, by the concentrated magnetic field from the first of said gaps to decay completely before any eddy current is produced in said part by the concentrated magnetic field from the other of said gaps even though the relative speed of the probe device and article being tested exceeds said 100 feet per minute.

2. In apparatus for magnetically testing elongate metallic articles for flaws, a probe device which may be moved relative to an article under test at speeds exceeding 100 feet per minute and still effect accurate flaw detection comprising a core of magnetic material, a flange of magnetic material at each end of the core, a flange of magnetic material intermediate the ends of the core, said flanges extending radially outwardly of said core, two insulated coil elements wound around said core, one between one pair of said flanges and the other between the other pair of said flanges, and pole pieces of magnetic material secured to said flanges and extending therefrom to form two sets of pole faces respectively between adjacent flanges, the pole pieces being substantially parallel to the axis of the core and the distance between adjacent pole faces of each pair of pole pieces forming a magnetic field concentration gap which is shorter than the distance between the associated adjacent flanges, said gaps being separated from each other a distance several times the width of either of the gaps to allow all eddy currents produced, in any given part of an article under test, by the concentrated magnetic field from the first of said gaps to decay completely during relative motion between said probe device and the article being tested and before any eddy current is produced in said part by the concentrated magnetic field from the other of said gaps even though the relative speed of the probe device and article being tested exceeds said 100 feet per minute.

3. In apparatus for magnetically testing elongate metallic articles for flaws, a probe device which may be moved relative to an article under test at speeds exceeding 100 feet per minute and still effect accurate flaw detection comprising a core of magnetic material, a flange of magnetic material at each end of the core, a flange of magnetic material intermediate the ends of the core, said flanges extending radially outwardly of said core, two insulated coil elements wound around said core, one between each pair of said flanges and the other between the other pair of said flanges, and pole pieces of magnetic material secured to said flanges and extending therefrom to form two sets of pole faces respectively between adjacent flanges, the pole pieces being substantially parallel to the axis of the core, the pole faces of the pole pieces being perpendicular to the axis of the core, and the distance between adjacent pole faces of each pair of pole pieces from a magnetic field concentration gap which is shorter than the distance between the associated adjacent flanges, said gaps being separated from each other a distance several times the width of either of the gaps to allow all eddy currents produced, in any given part of an article under test, by the concentrated magnetic field from the first of said gaps to decay completely before any eddy current is produced in said part by the concentrated magnetic field from the other of said gaps even though the relative speed of the probe device and article being tested exceeds said 100 feet per minute.

4. In apparatus for magnetically testing elongate metallic articles for flaws, a probe device according to claim 3, in which the coils are substantially identical and the distance between the adjacent pole faces of one pair of pole pieces is the same as the distance between the adjacent pole faces of the other pair of pole pieces.

5. In apparatus for magnetically testing elongate metallic articles for flaws, a probe device according to claim 3 in which the coils are substantially identical and the distance between the adjacent pole faces of one pair of pole pieces is different from the distance between the adjacent pole faces of the other pair of pole pieces.

6. In apparatus for magnetically testing elongate metallic articles for flaws, a probe device which may be moved relative to an article under test at speeds exceeding 100 feet per minute and still effect accurate flaw detection comprising a core of magnetic material, a flange of magnetic material at each end of the core, a flange of magnetic material intermediate the ends of the core, said flanges extending radially outwardly of said core, two insulated coil elements wound around said core one between one pair of said flanges and the other between the other pair of said flanges, and pole pieces of magnetic material secured to said flanges, the pole pieces being substantially parallel to the axis of the core, the pole faces of the pole pieces being inclined at an angle to the axis of the core, and the distance between the adjacent pole faces of each pair of pole pieces being less than the distance between adjacent flanges.

7. In apparatus for magnetically testing elongate metallic articles for flaws, a probe device according to claim 6, in which the distance between the adjacent pole faces of one pair of pole pieces is the same as the distance between the adjacent pole faces of the other pair of pole pieces.

8. In apparatus for magnetically testing elongate metallic articles for flaws, a probe device according to claim 6, in which the distance between the adjacent pole faces of one pair of pole pieces is different from the distance between the adjacent pole faces of the other pair of pole pieces.

9. In apparatus for magnetically testing elongate metallic articles for flaws, a probe device which may be moved relative to an article under test at speeds exceeding 100 feet per minute and still effect accurate flaw detection comprising a hollow core of non-magnetic material, two flanges of non-magnetic material on said core extending radially outwardly thereof, and an insulated coil element wound around said core between said flanges, and pole pieces of magnetic material secured to the internal surface of the core and associated with the coil, pole pieces being substantially parallel to the axis of the core and the distance between the two pole faces of the pole pieces being less than the distance between the flanges.

10. In apparatus for magnetically testing elongate metallic articles for flaws, a probe device which may be moved relative to an article under test at speeds exceeding 100 feet per minute and still effect accurate flaw detection comprising a hollow core of non-magnetic material, three flanges of non-magnetic material extending outwardly of said core, two insulated coil elements wound around said core one between one pair of said flanges and the other between the other pair of said flanges, and pole pieces of magnetic material secured to the internal surface of the core, one pair of pole pieces being associated with one coil and forming a first magnetic field concentration gap between the associated pair of flanges, the other pair of pole pieces being associated with the other coil and forming a second magnetic field concentration gap between the associated pair of flanges, said pole pieces being substantially parallel to the axis of the core and the distance between the adjacent pole faces of each pair of pole pieces being less than the axial length of the coil, said gaps being separated from each other a distance several times the width of either of the gaps to allow all eddy currents produced, in any given part of an article under test, by the concentrated magnetic field from the first of said gaps to decay completely during relative motion between said probe device and the article being tested and before any eddy current is produced in said part by the concentrated magnetic field from the other of said gaps even though the relative speed of the prove device and article being tested exceeds said 100 feet per minute.

11. In apparatus for magnetically testing elongate metallic articles for flaws, a probe device which may be moved relative to an article under test at speeds exceeding 100 feet per minute and still effect accurate flaw detection comprising a hollow core of non-magnetic material, three flanges of non-magnetic material extending radially outwardly of said core, two insulated coil elements wound round said core, one between one pair of said flanges and the other between the other pair of said flanges, and pole pieces of magnetic material secured to the internal surface of the core, one pair of pole pieces being associated with one coil and forming a first magnetic field concentration gap between the associated pair of flanges, the other pair of pole pieces being associated with the other coil and forming a second magnetic field concentration gap between the associated pair of flanges, said pole pieces being substantially parallel to the axis of the core, the pole faces of the pole pieces being perpendicular to the axis of the core, and the distance between the pole faces and each pair of pole pieces being less than the distance between the associated adjacent flanges, said gaps being separated from each other a distance several times the width of either of the gaps to allow all eddy currents produced, in any given part of an article under test, by the concentrated magnetic field from the first of said gaps to become juxtaposed said part due to relative motion between said probe device and the article being tested, to decay completely before any eddy current is produced in said part by the concentrated magnetic field from the other of said gaps even though the relative speed of the probe device and article being tested exceeds said 100 feet per minute.

12. In apparatus for magnetically testing elongate metallic articles for flaws, a probe device according to claim 11, in which the coils are substantially identical and the distance between the adjacent pole faces of one pair of pole pieces is the same as the distance between the adjacent pole faces of the other pair of pole pieces.

13. In apparatus for magnetically testing elongate metallic articles for flaws, a probe device according to claim 11, in which the coils are substantially identical and the distance between the adjacent pole faces of one pair of pole pieces is different from the distance between the adjacent pole faces of the other pair of pole pieces.

14. In apparatus for magnetically testing elongate metallic articles for flaws, a probe device which may be moved relative to an article under test at speeds exceeding 100 feet per minute and still effect accurate flaw detection comprising a hollow core of non-magnetic material, three flanges of non-magnetic material extending radially outwardly of said core, two insulated coil elements wound round said core, one between one pair of said flanges and the other between the other pair of said flanges, and pole pieces of magnetic material secured to the internal surface of thec ore, one pair of pole pieces being associated with one coil and forming a first magnetic field concentration gap between the associated pair of flanges the other pair of pole pieces being associated with the other coil and forming a second magnetic field concentration gap between the associated pair of flanges, said pole pieces being substantially parallel to the axis of the core, the pole faces of the pole pieces being inclined at an angle to the axis of the core, and the distance between the pole faces and each pair of pole pieces being less than the distance between the associated adjacent flanges, said gaps being separated from each other a distance several times the width of either of the gaps to allow all eddy currents produced, in any given part of an article under test, by the concentrated magnetic field from the first of said gaps to become juxtaposed said part due to relative motion between said probe device and the article being tested, to decay completely before any eddy current is produced in said part by the concentrated magnetic field from the other of said gaps even though the relative speed of the probe device and article being tested exceeds said 100 feet per minute.

15. In apparatus for magnetically testing elongate metallic articles for flaws, a probe device according to claim 14, in which the distance between the adjacent pole faces of one pair of pole pieces is the same as the distance between the adjacent pole faces of the other pair of pole pieces.

16. In apparatus for magnetically testing elongate metallic articles for flaws, a probe device according to claim 14, in which the distance between the adjacent pole faces of one pair of pole pieces is different from the distance between the adjacent pole faces of the other pair of pole pieces.

17. In apparatus including a bridge circuit connected to a generator of electrical oscillations for magnetically testing metallic articles for flaws, two coils, at least one of which is for a respective one of two different arms of said bridge circuit, a core for each of said coils, a flange at each end of each coil, and a magnetic pole piece extending from each flange to form two sets of pole faces respectively between each two adjacent flanges, the distance between the pole faces of each set thereof forming a magnetic field concentration gap which is shorter than the axial length of the associated coil, said gaps being separated from each other a distance several times the width of either of the gaps to allow all eddy currents produced, in any given part of an article under test, by the concentrated magnetic field of the first of said gaps to decay completely before any eddy current is produced in said part by the concentrated magnetic field from the other of said gaps and thereby effect accurate flaw detection even though the relative motion speed exceeds 100 feet per minute.

18. Apparatus as in claim 17 including means for effecting different magnetic fields at said two sets of pole faces respectively during the testing of an article.

19. Apparatus as in claim 1 including means for effecting a difference between the magnetic field at one gap and the magnetic field at the other gap.

20. Apparatus as in claim 19 wherein the gaps are of different widths to effect said difference between the magnetic fields.

21. Apparatus as in claim 1 wherein the pole faces of at least one set thereof are inclined at an angle to the axis of said core.

22. Apparatus as in claim 1 wherein the probe device is constructed to test the exterior surface of a metallic article.

23. Apparatus as in claim 1 wherein the probe device is constructed to test the interior surface of a hollow metallic article.

24. In a method of testing a metallic article for flaws by a probe device, the steps of relatively moving said article and device at a speed exceeding 100 feet per minute, producing eddy currents in successive parts of said article by a concentrated magnetic field issuing from a leading gap in said device, producing other eddy currents in said parts respectively at later times by a second magnetic field issuing from a lagging gap in said device, and causing any eddy current produced from the leading gap field in any of said parts to decay completely before the production in that part of any eddy current by the lagging gap field.

References Cited in the file of this patent

UNITED STATES PATENTS

| | | |
|---|---|---|
| 2,259,904 | McNamee et al. | Oct. 21, 1941 |
| 2,508,494 | Cook et al. | May 23, 1950 |
| 2,540,588 | Long | Feb. 6, 1951 |
| 2,540,589 | Long | Feb. 6, 1951 |
| 2,811,690 | Sargent | Oct. 29, 1957 |